US008982383B2

(12) United States Patent
Lee

(10) Patent No.: US 8,982,383 B2
(45) Date of Patent: Mar. 17, 2015

(54) METHOD AND PROGRAM FOR A UNIVERSAL JOB DEFINITION FORMAT (JDF) PRINTER DRIVER

(75) Inventor: James Jung-Hyun Lee, Los Angeles, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 875 days.

(21) Appl. No.: 12/751,920

(22) Filed: Mar. 31, 2010

(65) Prior Publication Data

US 2011/0242581 A1    Oct. 6, 2011

(51) Int. Cl.
*G06F 3/12* (2006.01)
*G06K 15/00* (2006.01)

(52) U.S. Cl.
CPC .............. *G06F 3/1253* (2013.01); *G06F 3/122* (2013.01); *G06F 3/1228* (2013.01); *G06F 3/1232* (2013.01); *G06F 3/1204* (2013.01); *G06F 3/1246* (2013.01)
USPC .......... 358/1.15; 358/1.13; 358/1.18; 358/1.9

(58) Field of Classification Search
CPC ............................. G06F 3/1228; G06F 3/1246
See application file for complete search history.

(56) References Cited

U.S. PATENT DOCUMENTS

| 6,975,415 | B2 | 12/2005 | Yamade |
| 2006/0106775 | A1* | 5/2006 | Kuhn et al. ................. 707/3 |
| 2007/0279125 | A1 | 12/2007 | Tripathi et al. |
| 2009/0103128 | A1* | 4/2009 | Maeda ..................... 358/1.15 |
| 2009/0279125 | A1* | 11/2009 | Liu et al. .................. 358/1.15 |
| 2010/0188688 | A1* | 7/2010 | Selvaraj et al. ............ 358/1.15 |

* cited by examiner

*Primary Examiner* — Dov Popovici
(74) *Attorney, Agent, or Firm* — Chen Yoshimura LLP

(57) ABSTRACT

A method and program for a universal Job Description Format (JDF) printer driver. The universal JDF printer driver computer software program product has a computer readable program code embedded in a computer usable storage medium for controlling a data processing apparatus, where the program code is configured to cause the data processing apparatus to execute a process for generating a JDF job ticket for printing documents by a JDF compatible printing device. The process implemented by the universal JDF printer driver has the steps of obtaining device capabilities information from the JDF compatible printing device and creating a baseline JDF job ticket based on the device capabilities information, providing a graphical user interface to allow a user to modify the baseline JDF job ticket interactively, and generating a syntactically and semantically correct final JDF job ticket compatible with the device capabilities of the JDF compatible printing device.

21 Claims, 8 Drawing Sheets

METHOD AND PROGRAM FOR A UNIVERSAL JOB DEFINITION FORMAT (JDF) PRINTER DRIVER

BACKGROUND OF THE INVENTION

1. Field of the Invention

This invention relates generally to methods for providing printer driver programs, and in particular, it relates to methods for providing Job Definition Format (JDF) printer driver programs.

2. Description of Related Art

Job Description Format (JDF) is a technical standard developed by the printing industry to facilitate cross-vendor workflow implementations of printer applications. It is an Extensible Markup Language (XML)-based format for print job order files, often referred to as "job tickets".

A job ticket contains specified values of various print job parameters, and associates itself to one or more source files (i.e. the documents to be printed). A typical job ticket may include a job ticket number, ticket name, and the values of various job parameters such as job information settings, basic settings (e.g. number of copies, orientation of paper, collate, offset printing, original paper size, output paper size, paper type, paper source, etc.), layout settings, cover sheet, finishing settings, inter-sheet settings, tab-paper settings, image quality settings, and customer information.

Various standards have been developed for the formats of writing a print job ticket, including the Print Production Format (PPF) and the Portable Job Ticket Format (PJTF). JDF is built upon these existing formats and provides three primary benefits to the printing industry: (1) the ability to unify the prepress, press and post-press aspects of any printing job; (2) the means to bridge the communication gap between production services and management information systems (MIS); and (3) the ability to carry out both of these functions no matter what system architecture is already in place and no matter what tools are being used to complete the job.

JDF provides a versatile and comprehensive interchange data format to be used by a system of administrative and implementation-oriented components, which together produce printed products. It provides the means to describe print jobs in terms of the products eventually to be created, as well as in terms of the processes needed to create those products. The format provides a mechanism to explicitly specify the controls needed by each process, which may be specific to the printers that will execute the processes.

Many printing devices now are "JDF compatible", i.e., can process a JDF job ticket to perform a printing job. They typically have a print server or other control devices for receiving a JDF job ticket and processing the information specified in the JDF job ticket to directly control the print job. However, a JDF job ticket still needs to be generated in accordance with the device capabilities of a particular printing device, which will determine what JDF entries may or may not be acceptable by the specific printing device.

In a typical printing workflow that involves JDF, a printing application generates and sends a JDF print job ticket to be executed on a printing device. Before sending the JDF job ticket, the application must first know what JDF entries in the job ticket the device will actually accept. This is generally accomplished by first querying the printing device for its device capabilities. The device capabilities will tell the application what specific JDF entries will be accepted and executed on the printing device. The method for achieving this compatibility between the generated JDF job ticket and a device's capabilities are application-specific, as some JDF-based printing applications may not be able to support all JDF compatible printing devices because they may have a particular way of generating JDF job tickets that may or may not be compatible with a particular printing device.

Various methods and programs have been developed to generate printer device-specific JDF job tickets. For example, U.S. Patent Application Publication No. 2007/0279125 A1 describes a method for generating a JDF job ticket using a printer definition file (e.g., a Postscript Printer Definition (PPD) file, or a General Printer Definition (GPD) file) corresponding to a specific printing system, by defining print parameters from selected available features in the printer definition file. The available features in the printer definition file may be presented to an application program or to a user. The application or user may select desired features from those presented. The JDF elements corresponding to the selected features are output and stored as a JDF job ticket representing a print job to be processed by the selected printing system according to the defined print parameters.

When a printer definition file for a particular printing system is not readily available, a user may have to create a compatible JDF job ticket for a printing device by inspecting its device capabilities manually. But this can be quite a difficult task at times, especially if the user is not familiar with device capabilities and how they work, or if the user is not familiar with JDF, as the JDF job ticket must be created without error, i.e., it must be syntactically and semantically correct in JDF and also in accordance with the printing device's capabilities.

Printer drivers are computer software programs that convert the data to be printed to the form specific to a printing device. For example, U.S. Pat. No. 6,975,415 B2 describes a printer with a data processing apparatus that uses a printer driver software to set print conditions. The general purpose of using printer drivers is to allow applications to perform printing jobs without knowing the technical details of each printer model.

SUMMARY

The present invention is directed to a method and program for a universal job definition format print driver that substantially obviates one or more of the problems due to limitations and disadvantages of the related art.

Different printing device typically require different printer drivers. One object of the present invention is to provide a universal printer driver that can work with all JDF compatible printing devices.

Embodiments of the present invention provide a method and program for a user to generate a JDF print job ticket for a JDF compatible printing device without requiring the user to access a printer definition file or without the printer definition file readily available to the user.

Embodiments of the present invention also provide a method and program for a user to generate a JDF print job ticket for a JDF compatible printing device without requiring the user to be familiar with the specifics of that JDF device's capabilities.

Embodiments of the present invention further provide a user-friendly graphical user interface (GUI) to ensure that a syntactically and semantically correct JDF job tickets can be generated for a specified JDF compatible printing device based on its device capabilities.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a JDF job ticket for printing one or more documents by a JDF compatible printing device. Embodiments of the present invention's method implemented by a data processing apparatus for generating a JDF job ticket by a universal JDF printer driver connectable to the data processing apparatus include the steps of obtaining device capabilities information from the JDF compatible printing device, and creating a baseline JDF job ticket based on the device capabilities information of the JDF compatible printing device. Embodiments of the present invention's method for generating a JDF job ticket also include the steps of providing a graphical user interface (GUI) to allow a user to modify the baseline JDF job ticket interactively, and generating a syntactically and semantically correct final JDF job ticket compatible with the device capabilities of the JDF compatible printing device.

In another aspect, embodiments of the present invention provides a universal JDF printer driver computer software program product. Embodiments of the present invention's universal JDF printer driver have a computer readable program code embedded in a computer usable storage medium for controlling a data processing apparatus, where the computer readable program code is configured to cause the data processing apparatus to execute a process for generating a JDF job ticket for printing one or more documents by a JDF compatible printing device connectable to the data processing apparatus. Exemplary processes implemented by the present invention universal JDF printer driver include the steps of obtaining device capabilities information from the JDF compatible printing device and creating a baseline JDF job ticket based on the device capabilities information of the JDF compatible printing device. Exemplary processes implemented by the present invention universal JDF printer driver also include the step of providing a graphical user interface (GUI) to allow a user to modify the baseline JDF job ticket interactively, and generating a syntactically and semantically correct final JDF job ticket compatible with the device capabilities of the JDF compatible printing device.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a universal JDF printer driver for all JDF compatible printers. The universal JDF printer driver is a computer software program that has computer program codes and instructions for implementing the steps of the present invention.

Figure 1:
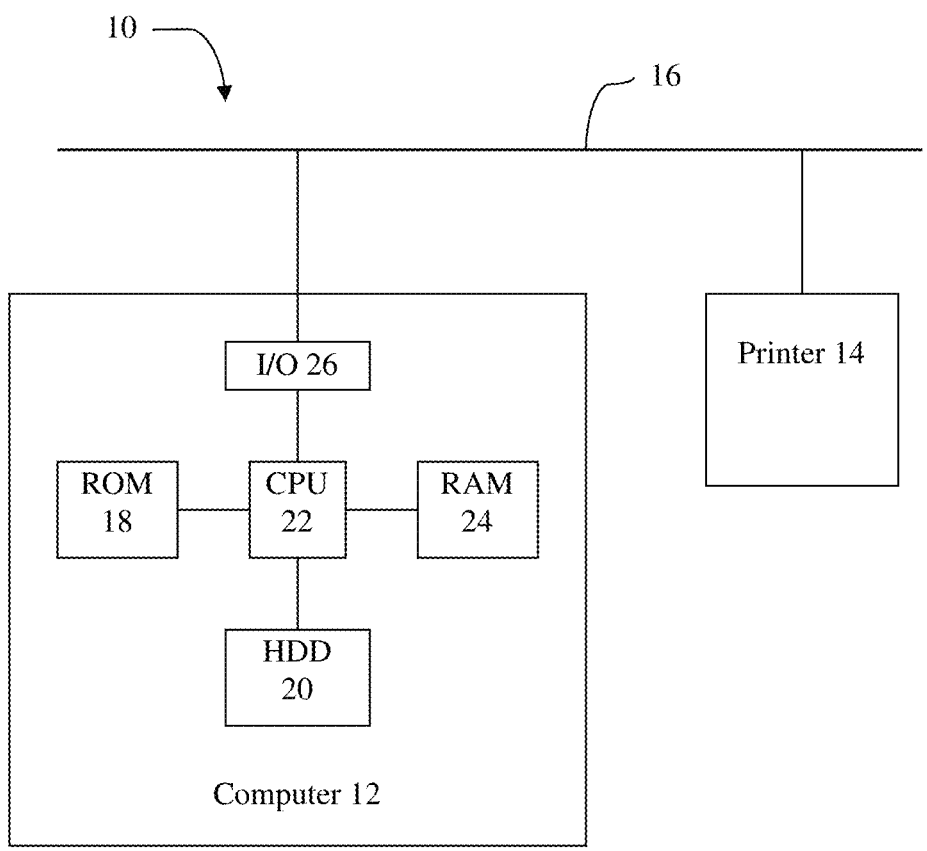
FIG. 1 illustrates an exemplary printing system implementing the universal JDF print driver according to an embodiment of the present invention.
Figure 2:
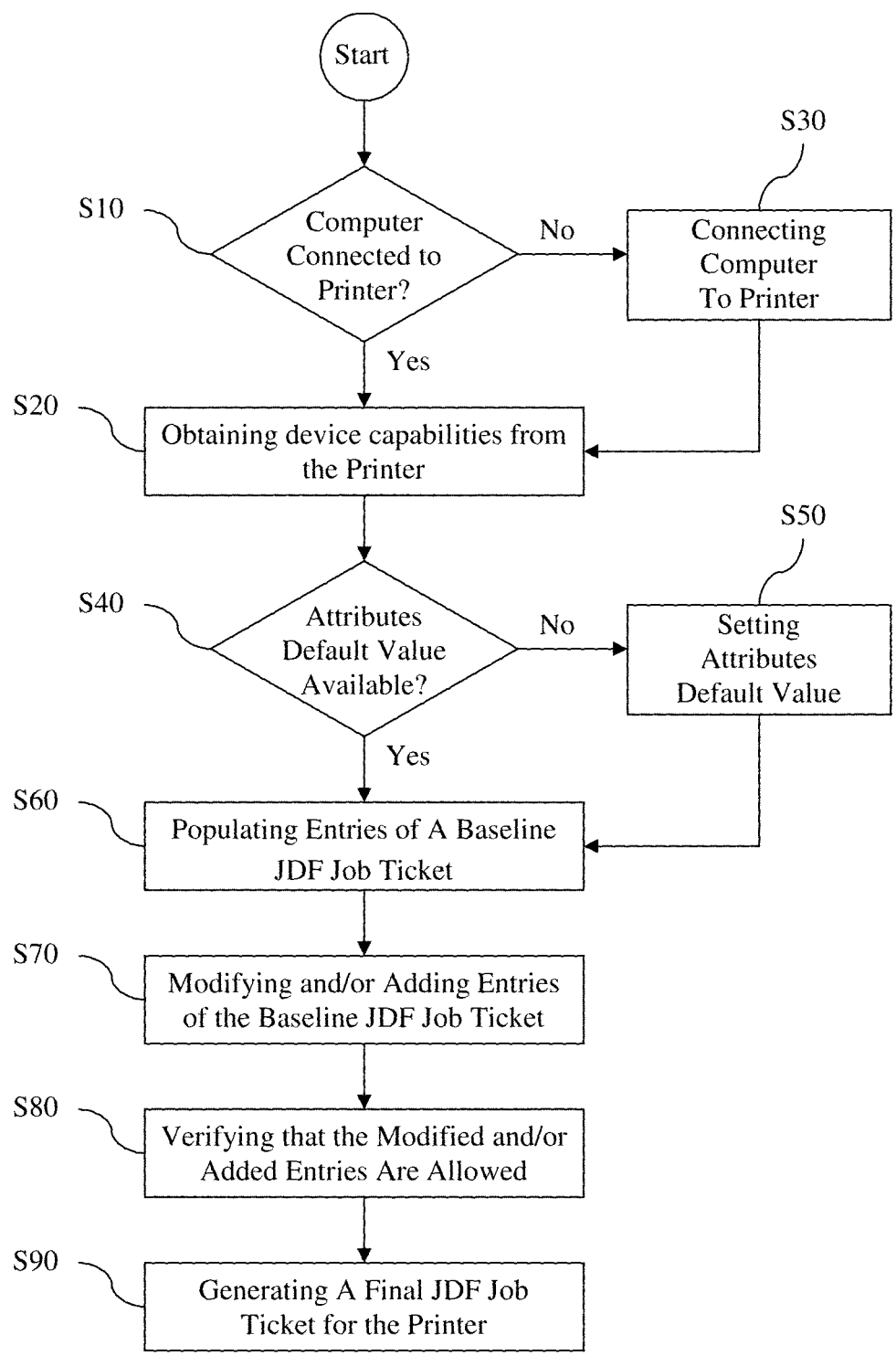
FIG. 2 illustrates an exemplary process implemented by a universal JDF print driver according to an embodiment of the present invention.

FIG. 1 illustrates a printing system implementing the universal JDF print driver according to an embodiment of the present invention. FIG. 2 illustrates a process implemented by a universal JDF print driver according to an embodiment of the present invention. FIGS. 3-8 show graphical user interfaces (GUI's) of various steps of the universal JDF printer driver software program.

Referring to FIG. 1, where is shown an exemplary printing system 10 implementing an embodiment of the present invention, the universal JDF printer driver software program may be installed on a computer 12, which may be a server, a control device or a data processing apparatus that is either directly attached to a printing device 14 or through a local area network (LAN) 16 which can be either wired or wireless, or through other suitable communication devices such as a serial bus or cable The universal JDF printer driver software program has a computer readable program code embedded and/or stored in a computer usable non-transitory storage medium such as a read only memory (ROM) 18 or a hard disk drive (HDD) 20 of the computer 12 that can be accessed by the central processing unit (CPU) 22 of the computer 12. Alternatively the universal JDF printer driver software program code may be stored in a computer usable transitory storage medium such as a universal serial bus (USB) storage medium or a compact disc read only memory (CDROM) which can be inserted into a computer so that the CPU 22 can access the program code stored therein. When the universal JDF printer driver software program is executed, the CPU reads out the program code of the universal JDF printer driver software program from the storage medium to a random access memory (RAM) 24 of the computer, causing the computer to carry out various steps and functions of the universal JDF printer driver software program. The computer has an input/output (I/O) port 26 for connection with the LAN 16 to control the function and operation of the printer 14 via LAN 16. The universal JDF printer driver software program is preferably designed to run on Windows® Operating System (OS), Macintosh® OS, Unix® OS or other suitable computer OS utilizing a GUI through a touch-screen and/or a mouse and a keyboard coupled with a display monitor.

The printing devices or systems that the present invention universal JDF printer driver is designed to work with are JDF compatible printing devices or systems that can be as small as a home printer or as large as a commercial print shop system, either stand-alone or networked. In this application, the term "computer" broadly refers to a computer, a server, a control device or a data processing apparatus that is either standalone or a part of a printing device or system, and the term "printer" broadly refers to any large or small printing devices or a system either stand-alone or networked.

Referring to FIG. 2, the process implemented by the present invention universal JDF printer driver is illustrated therein. As described earlier, the universal JDF printer driver computer software program is installed on a computer and when a JDF job ticket needs to be generated for printing one or more documents on a JDF compatible printer, the universal JDF printer driver computer software program is executed by the computer.

As an optional initial step the universal JDF printer driver software program will check to see whether the computer that executes the universal JDF printer driver software program is connected to a printer (step S10). If the computer is connected to a printer either directly or through a network, or is part of a printer, then the universal JDF printer driver software program will perform its next function of obtaining the device capabilities of the printer (step S20). However, if the computer is a stand-alone computer and is not connected to a printer either directly or through a network, then it needs to be connected to the printer first (step 30) before it can obtain the device capabilities of the printer.

Figure 3:
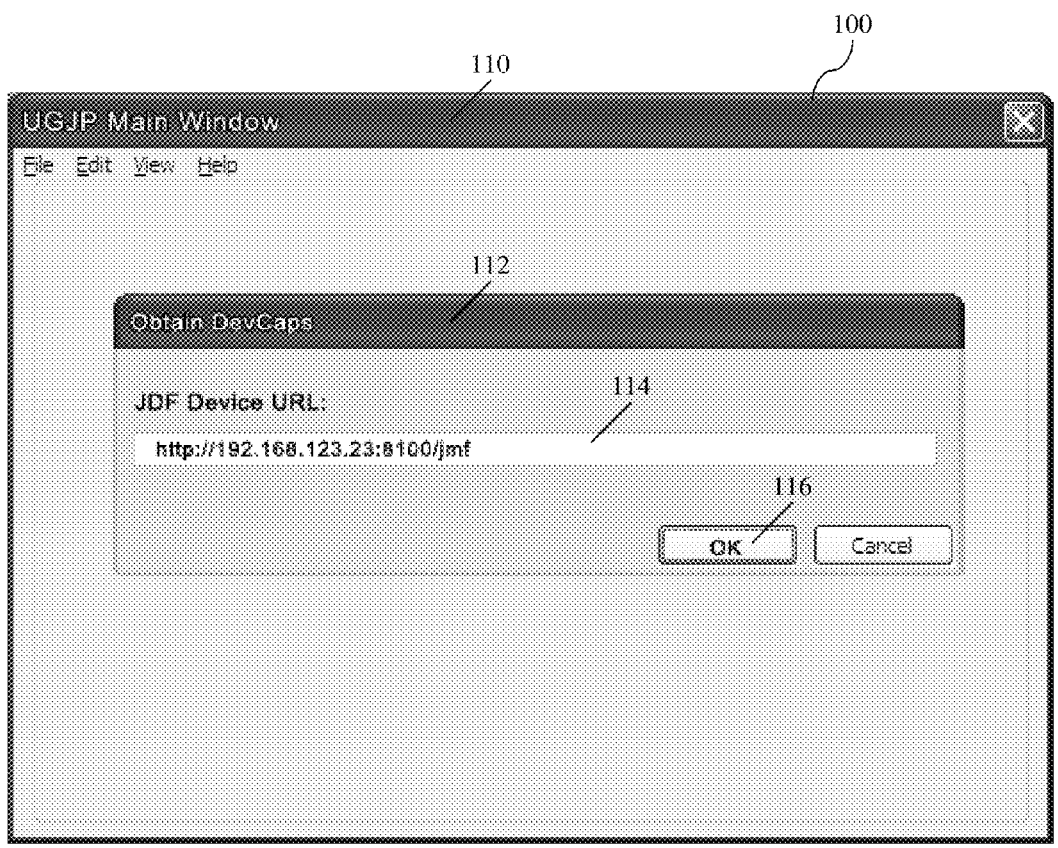
FIG. 3 shows an exemplary screenshot of the "Obtain DevCaps" graphical user interface (GUI) of the universal JDF printer driver according to an embodiment of the present invention.

Once the computer is connected to a JDF compatible printer either directly or through a network (or the computer is part of the JDF compatible printer), the universal JDF printer driver software program will query the printer and obtain the device capabilities of the printer (step S40). As shown in FIG. 3, the universal JDF printer driver provides a user-friendly GUI 100 for user interaction. In this embodiment of the present invention, the GUI 100 of the universal JDF printer driver has a main window 110 that is very similar to a typical window of the Windows® OS. An "Obtain DevCaps" dialog box 112 will be opened to inform the user of the Uniform Resource Locator (URL) 114 of a JDF compatible printer. The user may edit the URL 120 to direct the universal JDF printer driver to a different or specific printer. Once the correct JDF compatible printer is identified, the user may click on the "OK" button 116 to obtain the device capabilities of the identified printer.

The following TABLE 1 is an example of device capabilities of a typical JDF compatible printer:

TABLE 1

```
<?xml version="1.0" encoding="UTF-8" standalone="yes" ?>
<Device xmlns="http://www.CIP4.org/JDFSchema_1_3"
    DeviceID="My Digital Printer"
    JDFVersions="1.3 1.2 1.1"
    ICSVersions="Base_L3-1.0 IDP_L1-1.0"
    JMFSenderID="DigitalPrinting Device"
    JMFURL="http://150.16.239.11:30081/jdf-fum/jmf"
    DeviceType="DigitalPrinter"
    ModelName="MDP2000">
        <DeviceCap CombinedMethod="Combined" ExecutionPolicy="FirstFound"
GenericAttributes="ID Class Status SettingsPolicy BestEffortExceptions
MustHonorExceptions" TypeExpression="LayoutPreparation Imposition Interpreting
DigitalPrinting">
            <DevCaps Name="Media" Types="DigitalPrinting" Required="true">
                <DevCap>
                    <XYPairState Name="Dimension"UnitType="Length" AllowedValueList="612
792 765 1105 553 765 638 907 709 1001 499 709 647 792 631 841" HasDefault="true"
DefaultValue="612 792"/>
                    <EnumerationState Name="MediaType" AllowedValueList="Paper"
HasDefault="true" DefaultValue="Paper" />
                    <StringState Name="StockType" HasDefault="false">
                        <Value AllowedValue="Bond" />
                        <Value AllowedValue="Embossed" />
                    </StringState>
                    <StringState Name="UserMediaType" HasDefault="false">
                        <Value AllowedValue="User" />
                        <Value AllowedValue="BlankInsert" />
                        <Value AllowedValue="Preprinted" />
                    </StringState>
                    <StringState Name="MediaColorName" HasDefault="true"
DefaultValue="White">
                        <Value AllowedValue="White" />
                        <Value AllowedValue="ClearWhite" />
                        <Value AllowedValue="Yellow" />
                        <Value AllowedValue="Pink" />
                        <Value AllowedValue="Blue" />
                        <Value AllowedValue="Green" />
                    </StringState>
                    <IntegerState Name="Weight" UnitType=" Weight" AllowedValueList="40 ~ 350"
HasDefault="false"/>
                    <DevCap Name="Location" MinOccurs="0">
                        <StringState Name="LocationName">
                        <Value AllowedValue="Auto"/>
                        <Value AllowedValue="Tray-1"/>
                        <Value AllowedValue="Tray-2"/>
                        </StringState>
                    </DevCap>
                </DevCap>
            </DevCaps>
            <DevCaps Name="LayoutPreparationParams" Types="LayoutPreparation"
Required="true">
                <DevCap>
                    <EnumerationState Name="PartIDKeys" AllowedValueList="RunIndex CellIndex"
```

TABLE 1-continued

```
HasDefault="false"/>
            <EnumerationState Name="BindingEdge" AllowedValueList="Left Top Right"
HasDefault="false"/>
            <NameState Name="PageDistributionScheme" AllowedValueList="Sequential
Perfect" HasDefault="false"/>
            <EnumerationState Name="Sides" AllowedValueList="OneSidedFront
TwoSidedFlipY" HasDefault="true" DefaultValue="OneSidedFront"/>
            <NameState Name="PageOrder" AllowedValueList="Booklet"
HasDefault="false"/>
            <XYPairState Name="NumberUp" AllowedValueList="2 1 1 2"
HasDefault="false"/>
            <ShapeState Name="StepRepeat" AllowedValueList="1 0 0 0 1 0"
HasDefault="false"/>
            <DevCap Name="ImageShift">
                <XYPairState Name="ShiftFront" HasDefault="false" />
                <XYPairState Name="ShiftBack" HasDefault="false" />
            </DevCap>
            <DevCap Name="PageCell">
                <EnumerationState Name="Rotate" HasDefault="true" DefaultValue=" Rotate" />
                <DevCap Name="FitPolicy">
                    <EnumerationState Name="SizePolicy" AllowedValueList="Abort
ClipToMaxPage ReduceToFitFitToPage" HasDefault="false"/>
                </DevCap>
            </DevCap>
        </DevCaps>
        <DevCaps Name="RunList" Types="LayoutPreparation Interpreting"
Required="true">
            <DevCap>
                <EnumerationState Name="PartIDKeys" AllowedValueList="Run"
HasDefault="false"/>
                <IntegerState Name="Pages" AllowedValueList="0 ~ -1" HasDefault="false"/>
                <DevCap Name="LayoutElement">
                    <DevCap         Name="FileSpec">
                        <StringState Name="MimeType" HasDefault="false"/>
                        <StringState Name="URL" HasDefault="false" Required="true"/>
                        <StringState Name="UID" HasDefault="false" />
                    </DevCap>
                </DevCap>
            </DevCap>
        </DevCaps>
        <DevCaps Name="InterpretingParams" Types="Interpreting" Required="true">
            <DevCap>
                <EnumerationState Name="PrintQuality" AllowedValueList="Draft"
HasDefault="false"/>
            </DevCap>
        </DevCaps>
        <DevCaps Name="DigitalPrintingParams" Types="DigitalPrinting" Required="true">
            <DevCap>
                <EnumerationState Name="Collate" AllowedValueList="None Sheet"
HasDefault="true" DefaultValue="Sheet"/>
                <EnumerationState Name="PageDelivery" AllowedValueList="SameOrderFaceUp
SameOrderFaceDown ReverseOrderFaceUp ReverseOrderFaceDown"
HasDefault="false"/>
                <NameState Name="OutputBin" AllowedValueList="Auto LargeCapacity Stacker-
n StackerAuto" HasDefault="false"/>
            </DevCap>
        </DevCaps>
        <DevCaps Name="ComponentLink" Context="Link" LinkUsage="Output"
Types="DigitalPrinting" Required="true">
            <DevCap>
                <IntegerState Name=" Amount" AllowedValueList="1 ~ 9999"
HasDefault="false"/>
            </DevCap>
        </DevCaps>
</Device>
```

Again referring to FIG. 2, when obtaining the device capabilities from the printer, the universal JDF printer driver will also check to see whether the default values of the device capabilities attributes are available (step S40). If the default value of an attribute is not available, it must be set (step S50) before the print job can be performed.

Figure 4:
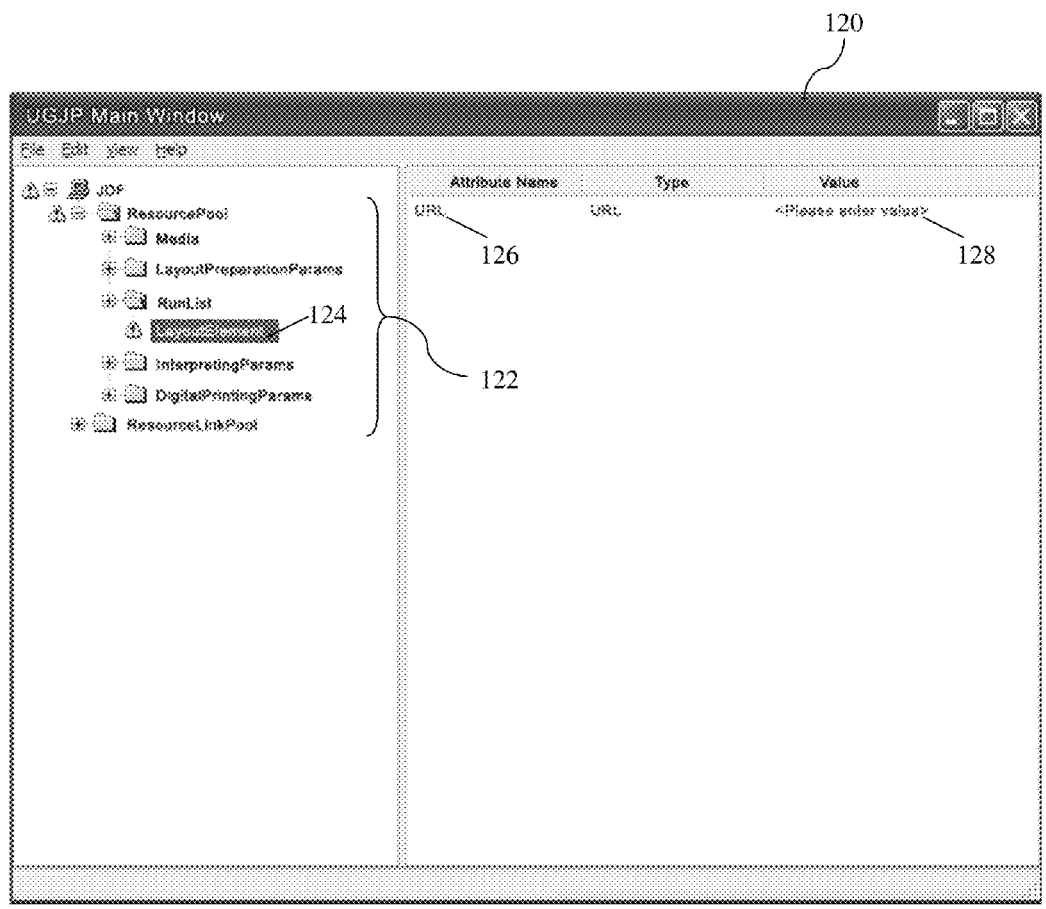
FIG. 4 shows an exemplary screenshot of the baseline JDF Job Ticket GUI of the universal JDF printer driver according to an embodiment of the present invention.
Figure 5:
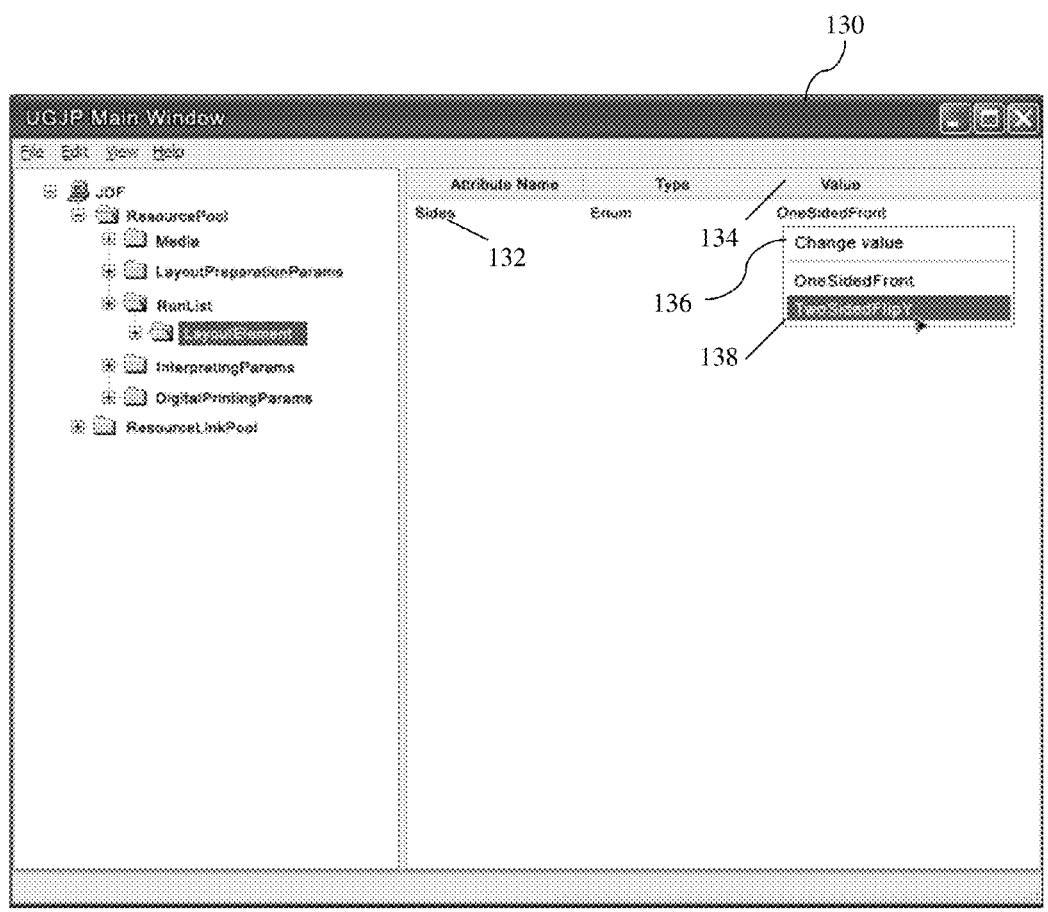
FIG. 5 shows an exemplary screenshot of how to modify an attribute value in the baseline JDF Job Ticket using the universal JDF printer driver according to an embodiment of the present invention.

After the universal JDF printer driver obtains the device capabilities of a JDF compatible printer, it interprets the device capabilities and creates a list tree interface representing the initial baseline JDF job ticket. As shown in FIG. 4, the list tree 122 in GUI 120 provides a main interface for interacting with the baseline JDF. Once the universal JDF printer driver has obtained and interpreted the device capabilities of a particular JDF compatible printer, the list tree 120 will be populated with JDF data/information entries obtained from reading and interpreting the printer's device capabilities (step S60 in FIG. 2). The initial populated data in the list tree will represent the baseline JDF entries for the printer, i.e., it will contain the minimal elements and attributes needed for the JDF entries to be accepted by the printer. Available attributes default values extracted from the device capabilities will be used in populating the list tree 122 of the baseline JDF job ticket. However, if an attribute is required but its default value is not available, its containing element will be marked with an exclamation icon to notify the user that a default value must be provided for the attribute before finalizing the JDF job ticket. In the example shown in FIG. 4, the marked element 124 is "LayoutElement" in the left side of the window, indicating that one of its attributes "URL" 126 has no default value, and a field 128 under "Value" is provided for input of a default value. The attribute text will also have a distinct color, typically red, indicating that it needs to be set.

Once the initial baseline JDF job tickets is generated, the attribute values may be modified, and/or new attributes/entries may be added, as needed within what is allowed by the device capabilities of the printer (step S70 in FIG. 2). As shown in FIG. 4, the universal JDF printer driver provides a GUI 130 for the user to modify attribute values of the baseline JDF job ticket. In the example shown in FIG. 5, the value "OneSidedFont" of the attribute "Sides" 132 is being modified. The user can right-click on the "Value" column entry 134, and a "Change value" dialog box 136 appears with a drop-down menu with alternative values for the user to choose. The user can then left-click on the "TwoSidedFlip" value choice 138 to change the previous value ("OneSidedFont") of the attribute "Sides" 132 to "TwoSidedFlipY".

Figure 6:
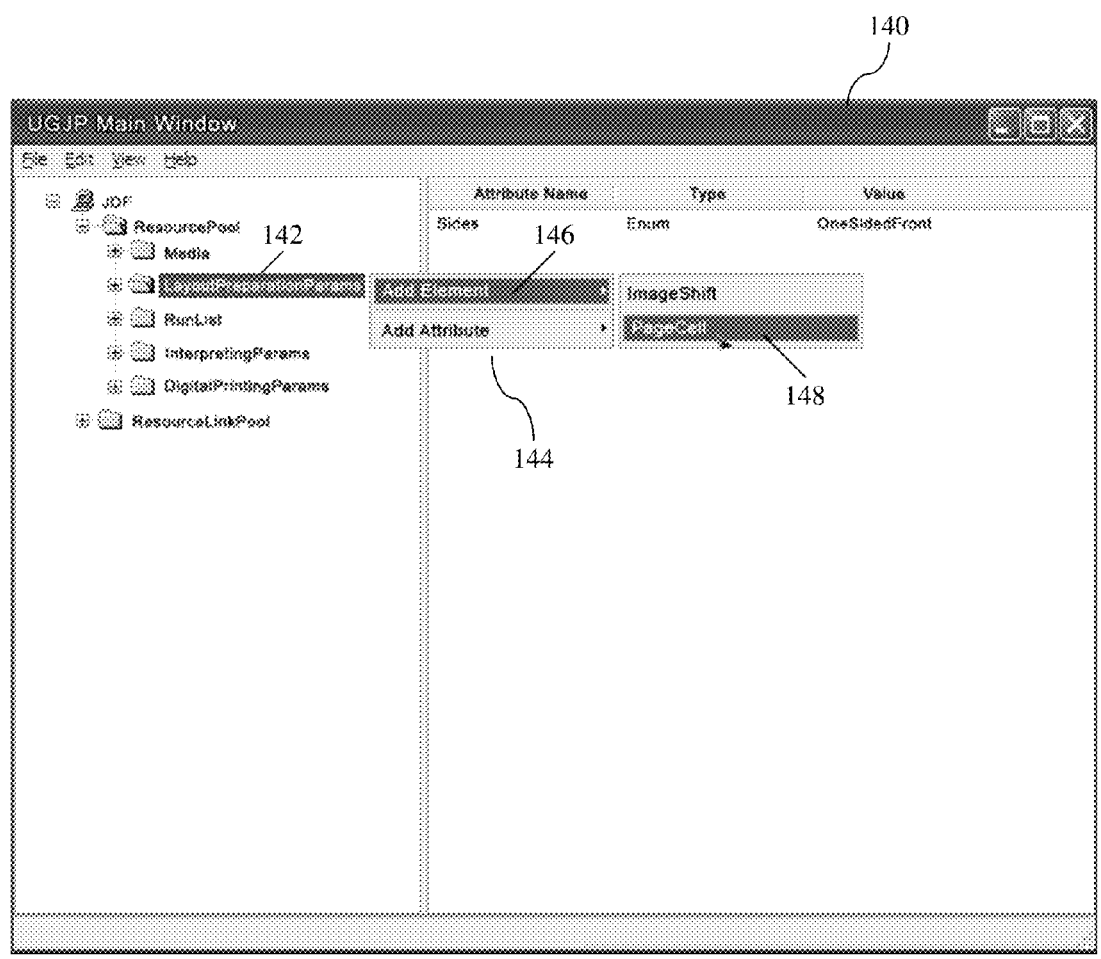
FIG. 6 shows an exemplary screenshot of how to add an element to the baseline JDF Job Ticket using the universal JDF printer driver according to an embodiment of the present invention.

As shown in FIG. 6, the universal JDF printer driver also provides a GUI 140 for the user to add elements to the baseline JDF job ticket. In the example shown in FIG. 5, the user can right-click on the "LayoutPreparationParams" item 142, and a dialog box 144 appears which allows the user to either add elements or add attributes. Highlighting over the "Add Element" tab 146 will provide a drop-down menu with elements that can be added under the printer's device capabilities, and further left-clicking on the "PageCell" element will add the element to the JDF job ticket.

Figure 7:
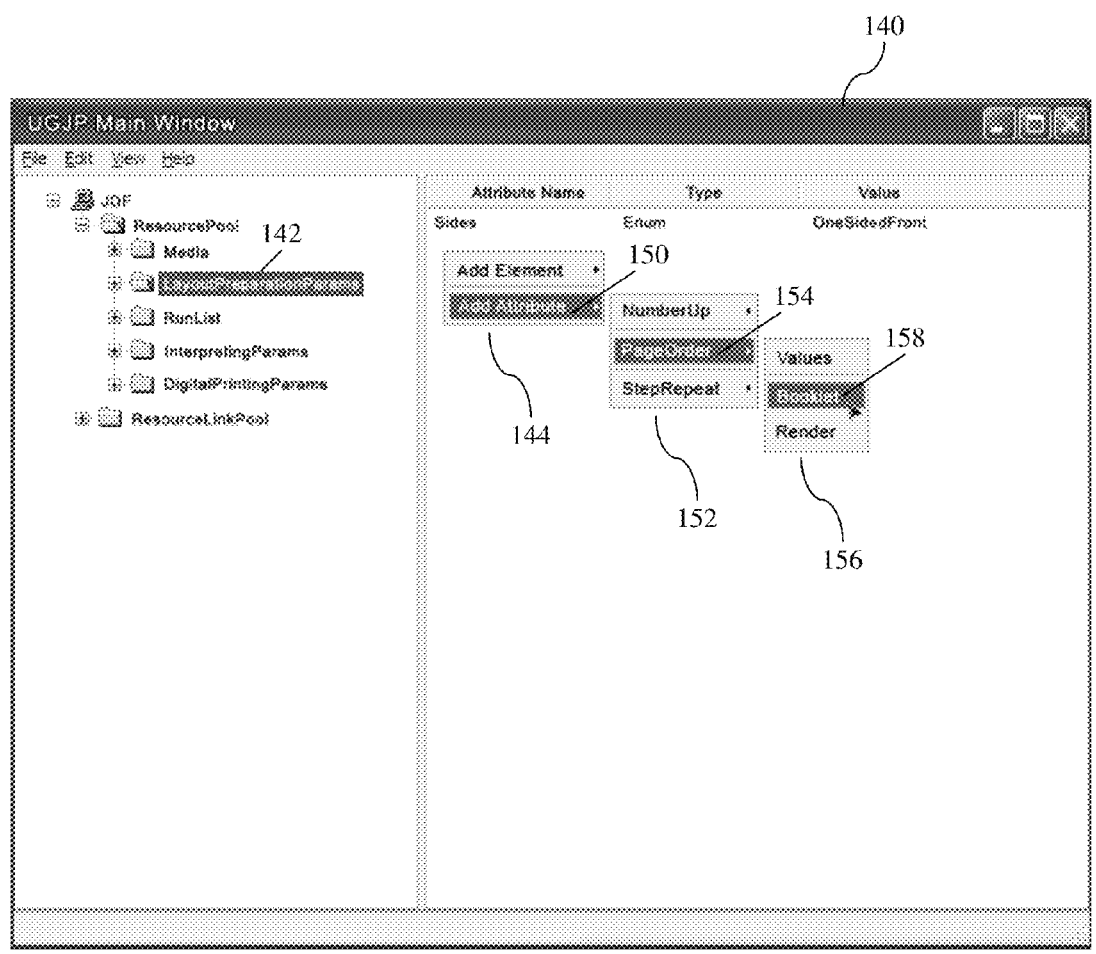
FIG. 7 shows an exemplary screenshot of how to add an attribute to the baseline JDF Job Ticket using the universal JDF printer driver according to an embodiment of the present invention.

As shown in FIG. 7, the universal JDF printer driver further allows the user to add attributes to the baseline JDF job ticket.

In the example shown in FIG. 7, the user can right-click on the "LayoutPreparationParams" item 142, and a dialog box 144 appears which allows the user to either add elements or add attributes. Highlighting over the "Add Attribute" tab 150 will provide a drop-down menu 152 with attributes that can be added under the printer's device capabilities. Highlighting over a menu item (such as "PageOrder" 154) will further provide a drop-down submenu 156 with choices for attribute values allowed under the printer's device capabilities, and further left-clicking on the "Booklet" attribute will add the attribute to the JDF job ticket with the assigned value.

The universal JDF printer driver will verify, based on the device capabilities of a particular printer, whether the modified and/or added attributes and elements are compatible with the device capabilities of the printer (step S80 in FIG. 2). If an attribute is not set correctly, its text color will have a distinct color, typically red, to alert the user of the error, so the user can make corrections accordingly. In addition, the attribute's containing element will be marked with an exclamation icon indicating that it contains an attribute which is set incorrectly.

Figure 8:
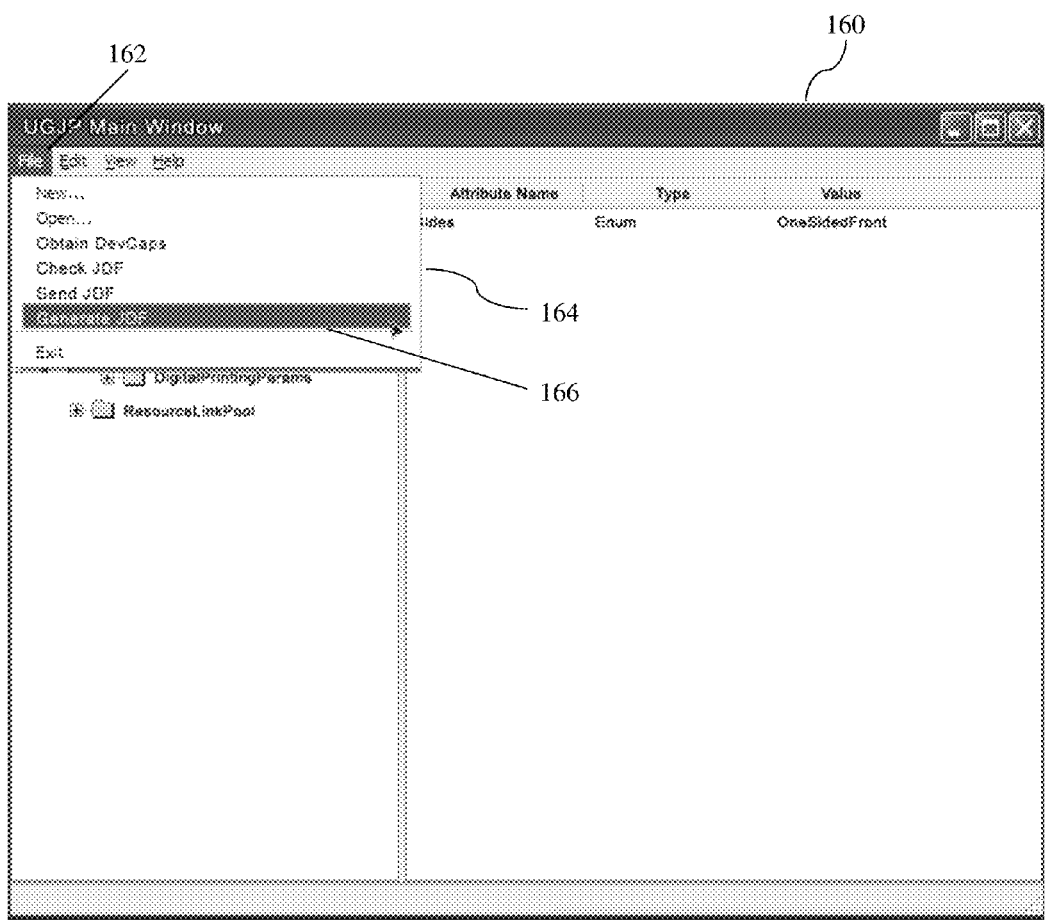
FIG. 8 shows an exemplary screenshot of how to generate the final JDF Job Ticket using the universal JDF printer driver according to an embodiment of the present invention.

Once the user finishes modifying and/or adding attributes values and elements, the universal JDF printer driver can generate the final JDF job ticket to be sent to the printer (step S90 in FIG. 2). As shown in FIG. 8, the GUI 160 of the universal JDF printer driver allows a user to click on the "File" tab 162 which provides a drop-down menu 164, and the user can click on the "Generate JDF" tab 166 to generate the final JDF job ticket based on the baseline JDF job ticket but incorporate all the modifications and additions made by the user in the previous steps. The universal JDF printer drive will ensure that the final JDF job ticket is syntactically and semantically correct according to the JDF standard, and also fully compatible with and readily compatible with the device capabilities of the printer.

The following TABLE 2 is an example of a final JDF job ticket generated by the universal JDF printer driver:

TABLE 2

```
<?xml version="1.0" encoding="UTF-8"?>
<JDF Activation="Active" Category="DigitalPrinting" ICSVersions="IDP_L1-1.0
Base_L3-1.0" ID="jdf_1" JobID="1" JobPartID="Job1" MaxVersion="1.2"
SettingsPolicy="BestEffort" Status="Waiting" Type="Combined"
Types="LayoutPreparation Imposition Interpreting Rendering DigitalPrinting"
Version="1.2" xmlns="http://www.CIP4.org/JDFSchema_1_1" DescriptiveName="Job
Number 1">
    <ResourcePool>
        <Media Class="Consumable" ID="res_8" Status="Available" />
        <LayoutPreparationParams Class="Parameter" ID="res_2" Status="Available"
Sides="TwoSidedFlipY" NumberUp="2 1" PageOrder="Booklet">
            <PageCell>
                <FitPolicySizePolicy="ReduceToFit"/>
            </PageCell>
        </LayoutPreparationParams>
        <RunList Class="Parameter" ID="res_3" Status="Available">
            <LayoutElement Class="Parameter" ID="res_9" Status="Available">
                <FileSpec MimeType="application/pdf" URL="/pdf_files/filename.pdf" />
            </LayoutElement>
        </RunList>
        <InterpretingParams Class="Parameter" ID="res_4" Status="Available" />
        <DigitalPrintingParams Class="Parameter" ID="res_6" Status="Available">
            <MediaRef rRef="res_8" />
        </DigitalPrintingParams>
        <Component Class="Quantity" ComponentType="FinalProduct" ID="res_7"
Status="Available" />
    </ResourcePool>
    <ResourceLinkPool>
        <LayoutPreparationParamsLink CombinedProcessIndex="0" Usage="Input"
rRef="res_2" />
        <RunListLink CombinedProcessIndex="0 1" ProcessUsage="Document"
Usage="Input" rRef="res_3" />
        <InterpretingParamsLink CombinedProcessIndex="2" Usage="Input" rRef="res_4" />
```

TABLE 2-continued

```
        <RenderingParamsLink CombinedProcessIndex="3" Usage="Input" rRef="res_5" />
        <DigitalPrintingParamsLink CombinedProcessIndex="4" Usage="Input" rRef="res_6"
/>
        <ComponentLink CombinedProcessIndex="4" Usage="Output" rRef="res_7" />
    </ResourceLinkPool>
</JDF>
```

The universal JDF printer driver provided by embodiments of the present invention has many advantages. It provides a printer driver that is compatible with virtually all JDF compliant/compatible printing devices. It also provides a compatible baseline JDF job ticket generated from obtaining and interpreting a particular printing device's capabilities. It further provides a user-friendly GUI that allows the user to easily modify and/or add attributes and elements to the baseline JDF job ticket that are allowed under the particular printing device's capabilities. Moreover, it ensures that a syntactically and semantically correct JDF job tickets is finally generated for the particular printing device based on its device capabilities.

Although examples of the GUI displays used in the various steps of the method for and program of a universal JDF printer driver are shown and described in detail here (e.g. FIGS. 3-8), the present invention is not limited to the specifics of the GUI described herein. The present invention may be implemented using any forms of GUI, as long as the GUI includes display means and input means that allow the user to specify various settings. Physical input means may include keyboards, mice, touch-screens, and other input devices. On-screen input displays may include buttons, check boxes, radio buttons, text input fields, drop-down menus, pop-up menus, icons, tabs for bringing up different sheets, separate windows, etc., or combinations thereof, or any other suitable structure of allowing the user to input information to the computer. The computer software designs for suitable structures of the input means are apparent and familiar to a person of ordinary skill in this field. Therefore, detailed descriptions for these structures are omitted from here. The term "GUI" or "user interface display" is used to generally mean any suitable screen display that displays information to the user and/or allows the user to input commands and other information, and is not limited to any specific form of display, and may include a series of consecutive displays.

It will be apparent to those skilled in the art that various modification and variations can be made to the universal JDF printer driver and related methods and programs of the present invention without departing from the spirit or scope of the invention. Thus, it is intended that the present invention cover modifications and variations that come within the scope of the appended claims and their equivalents.

What is claimed is:

1. A method implemented in a data processing apparatus for generating a Job Description Format, JDF, job ticket for printing one or more documents by a JDF compatible printing device having device capabilities connectable to the data processing apparatus, the method comprising the steps of:
   a. obtaining device capabilities information of the JDF compatible printing device, the device capabilities information containing a plurality of attributes, at least some of the attributes are designated as required, and at least some of the attributes are designated as having default values and at least some of the attributes are designated as having no available default values, and checking whether the device capabilities information of the JDF compatible printing device include any attributes that are designated as being required and having no available default values;
   b. creating a baseline JDF job ticket based on the device capabilities information of the JDF compatible printing device, the baseline JDF job ticket including all of the attributes that are designated as required in the device capabilities information, and marking the attributes of the device capabilities information that are designated in the device capabilities information as being required but having no available default values, to modify a user that default values for the marked attributes of the device capabilities information must be provided before the JDF job ticket can be generated;
   c. providing a graphical user interface, GUI, to provide a field for user input of a default value for a marked device capability attribute that has no available default value, and to allow the user to modify the baseline JDF job ticket interactively, wherein a value for any marked device capability in the baseline JDF job ticket must be provided by the user while a value of any device capability not marked may be optionally modified or added by the user; and
   d. generating the JDF job ticket which is syntactically and semantically correct and compatible with the device capabilities of the JDF compatible printing device.

2. The method for generating the JDF job ticket according to claim 1, further comprising the step of verifying whether the JDF compatible printing device is connected to the data processing apparatus and if not, connecting the JDF compatible printing device to the data processing apparatus to obtain the device capabilities information of the JDF compatible printing device from the JDF compatible printing device.

3. The method for generating the JDF job ticket according to claim 1, further comprising the step of interpreting JDF data from the device capabilities information of the JDF compatible printing device.

4. The method for generating the JDF job ticket according to claim 3, further comprising the step of populating entries of the baseline JDF job ticket with the JDF data interpreted from the device capabilities information of the JDF compatible printing device.

5. The method for generating the JDF job ticket according to claim 1, further comprising the step of populating entries of the baseline JDF job ticket with available default values of the device capabilities of the JDF compatible printing device.

6. The method for generating a JDF job ticket according to claim 1, further comprising the step of setting default values of the device capabilities of the JDF compatible printing device when they are not available, to be used for entries of the baseline JDF job ticket.

7. The method for generating the JDF job ticket according to claim 1, wherein the GUI allows the user to modify an element of the baseline JDF job ticket interactively.

8. The method for generating the JDF job ticket according to claim 1, wherein the GUI allows the user to add an element to the baseline JDF job ticket interactively.

9. The method for generating a JDF job ticket according to claim 1, wherein the GUI allows the user to modify an attribute of the baseline JDF job ticket interactively.

10. The method for generating the JDF job ticket according to claim 1, wherein the GUI allows the user to add an attribute to the baseline JDF job ticket interactively.

11. The method for generating the JDF job ticket according to claim 1, further comprising the step of verifying a modification made to the baseline JDF job ticket is syntactically and semantically correct according to JDF standard.

12. The method for generating the JDF job ticket according to claim 1, further comprising the step of verifying a modification made to the baseline JDF job ticket is acceptable by the device capabilities of the JDF compatible printing device.

13. A Universal Job Description Format, JDF, printer driver computer software program product having a computer readable program code embedded in a non-transitory computer usable storage medium for controlling a data processing apparatus, the computer readable program code configured to cause the data processing apparatus to execute a process for generating a JDF job ticket for printing one or more documents by a JDF compatible printing device having device capabilities connectable to the data processing apparatus, the process comprising the steps of:
   a. obtaining device capabilities information of the JDF compatible printing device, the device capabilities information containing a plurality of attributes, at least some of the attributes are designated as required, and at least some of the attributes are designated as having default values and at least some of the attributes are designated as having no available default values, and checking whether the device capabilities information of the JDF compatible printing device include any attributes that are designated as being required and having no available default values;
   b. creating a baseline JDF job ticket based on the device capabilities information of the JDF compatible printing device, the baseline JDF job ticket including all of the attributes that are designated as required in the device capabilities information, and marking the attributes of the device capabilities information that are designated in the device capabilities information as being required but having no available default values to modify a user that default values for the marked attributes of the device capabilities information must be provided before the JDF job ticket can be generated;
   c. providing a graphical user interface, GUI, to provide a field for user input of a default value for a marked device capability attribute that has no available default value, and to allow the user to modify the baseline JDF job ticket interactively, wherein a value for any marked device capability in the baseline JDF job ticket must be provided by the user while a value of any device capability not marked may be optionally modified or added by the user; and
   d. generating the JDF job ticket which is syntactically and semantically correct and compatible with the device capabilities of the JDF compatible printing device.

14. The universal JDF printer driver computer software program product according to claim 13, further comprising the step of verifying whether the JDF compatible printing device is connected to the data processing apparatus and if not, connecting the JDF compatible printing device to the data processing apparatus to obtain the device capabilities information of the JDF compatible printing device from the JDF compatible printing device.

15. The universal JDF printer driver computer software program product according to claim 13, further comprising the step of interpreting JDF data from the device capabilities information of the JDF compatible printing device.

16. The universal JDF printer driver computer software program product according to claim 15, further comprising the step of populating entries of the baseline JDF job ticket with the JDF data interpreted from the device capabilities information of the JDF compatible printing device.

17. The universal JDF printer driver computer software program product according to claim 13, further comprising the step of populating entries of the baseline JDF job ticket with available default values of the device capabilities of the JDF compatible printing device.

18. The universal JDF printer driver computer software program product according to claim 13, further comprising the step of setting default values of the device capabilities of the JDF compatible printing device when they are not available, to be used for entries of the baseline JDF job ticket.

19. The universal JDF printer driver computer software program product according to claim 13, wherein the GUI allows the user to modify or add an element or attribute of the baseline JDF job ticket interactively.

20. The universal JDF printer driver computer software program product according to claim 13, further comprising the step of verifying a modification made to the baseline JDF job ticket is syntactically and semantically correct according to JDF standard.

21. The universal JDF printer driver computer software program product according to claim 13, further comprising the step of verifying a modification made to the baseline JDF job ticket is acceptable by the device capabilities of the JDF compatible printing device.

* * * * *